(12) United States Patent
Teranishi et al.

(10) Patent No.: US 10,363,724 B2
(45) Date of Patent: Jul. 30, 2019

(54) RESIN COMPOSITION AND COMPRESSION-MOLDED ARTICLE OF SAME

(71) Applicant: Mitsubishi Chemical Corporation, Chiyoda-ku (JP)

(72) Inventors: Takuya Teranishi, Tokyo (JP); Akira Oota, Tokyo (JP); Masahiro Ichino, Tokyo (JP); Toru Kondo, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 79 days.

(21) Appl. No.: 15/509,574

(22) PCT Filed: Oct. 14, 2015

(86) PCT No.: PCT/JP2015/079060
§ 371 (c)(1),
(2) Date: Mar. 8, 2017

(87) PCT Pub. No.: WO2016/060166
PCT Pub. Date: Apr. 21, 2016

(65) Prior Publication Data
US 2017/0282516 A1    Oct. 5, 2017

(30) Foreign Application Priority Data
Oct. 16, 2014  (JP) ................. 2014-211346

(51) Int. Cl.
| | |
|---|---|
| B32B 27/38 | (2006.01) |
| C08L 63/00 | (2006.01) |
| C08G 59/20 | (2006.01) |
| C08G 59/40 | (2006.01) |
| C08J 5/24 | (2006.01) |
| B32B 5/28 | (2006.01) |
| C08L 51/00 | (2006.01) |
| B32B 5/02 | (2006.01) |
| C08G 59/22 | (2006.01) |

(52) U.S. Cl.
CPC .............. *B32B 27/38* (2013.01); *B32B 5/022* (2013.01); *B32B 5/28* (2013.01); *C08G 59/226* (2013.01); *C08J 5/24* (2013.01); *C08L 51/00* (2013.01); *C08L 63/00* (2013.01); *B32B 2307/718* (2013.01); *C08J 2363/00* (2013.01); *C08J 2433/02* (2013.01); *C08L 2207/53* (2013.01)

(58) Field of Classification Search
None
See application file for complete search history.

(56) References Cited

U.S. PATENT DOCUMENTS

| | | | |
|---|---|---|---|
| 4,985,530 A * | 1/1991 | Murakami | C08G 59/245 525/524 |
| 5,665,776 A | 9/1997 | Yu et al. | |
| 6,063,839 A | 5/2000 | Oosedo et al. | |
| 6,287,696 B1 | 9/2001 | Noda et al. | |
| 2001/0016604 A1 | 8/2001 | Yu et al. | |
| 2003/0017130 A1 | 1/2003 | Yu et al. | |
| 2009/0198012 A1 | 8/2009 | Sakata et al. | |
| 2011/0009528 A1 | 1/2011 | Tomioka et al. | |
| 2013/0274413 A1* | 10/2013 | Ozeki | C08J 5/042 524/611 |
| 2013/0327479 A1 | 12/2013 | Ichino et al. | |
| 2014/0350186 A1 | 11/2014 | Hatae et al. | |
| 2018/0142057 A1* | 5/2018 | Oota | C08J 5/24 |

FOREIGN PATENT DOCUMENTS

| | | | |
|---|---|---|---|
| EP | 0 273 202 A2 | 7/1988 | |
| EP | 2 248 838 A1 | 11/2010 | |
| EP | 2 682 429 A1 | 1/2014 | |
| JP | 08067804 A * | 3/1996 | ............ C08L 63/00 |
| JP | 9-025393 A | 1/1997 | |
| JP | 10-237196 A | 9/1998 | |
| JP | 11-5887 A | 1/1999 | |
| JP | 2001-26720 A | 1/2001 | |
| JP | 2006-257391 A | 9/2006 | |
| JP | 2012-36347 | 2/2012 | |
| JP | 2013-224448 A | 10/2013 | |
| WO | WO 2013/094759 A1 | 6/2013 | |

OTHER PUBLICATIONS

Machine translation of JP-08067804-A (no date).*
Machine translation of JP 2006-257391 A (no date).*
International Search Report dated Dec. 28, 2015, in PCT/JP2015/079060 filed Oct. 14, 2015.
Extended European Search Report dated Oct. 6, 2017 in Patent Application No. 15851424.0.

* cited by examiner

*Primary Examiner* — Michael J Feely
(74) *Attorney, Agent, or Firm* — Oblon, McClelland, Maier & Neustadt, L.L.P.

(57) ABSTRACT

A resin composition including an epoxy resin (A), a curing agent (B), and vinyl polymer particles (C), in which the contained amount of epoxy resin (a1) having a molecular weight of 100-480 is 30-90 parts by mass per 100 parts by mass of the epoxy resin (A), the contained amount of epoxy resin (a2) having a molecular weight of 2,000-40,000 is 10-70 parts by mass per 100 parts by mass of the epoxy resin (A), the contained amount of the vinyl polymer particles (C) is 2-30 parts by mass per 100 parts by mass of the epoxy resin (A), and the instantaneous maximum thickening value of the vinyl polymer particles obtained by the following method is 0.3-5.0 Pa·s/° C.

17 Claims, No Drawings

RESIN COMPOSITION AND COMPRESSION-MOLDED ARTICLE OF SAME

TECHNICAL FIELD

The present invention relates to a prepreg that exhibits excellent drapability and an appropriate amount of resin flow during a molding process, to a compression-molded article formed accordingly using the prepreg, and to a resin composition that exhibits excellent results of impregnation into reinforcing fiber material so as to form the prepreg.

The present application is based upon and claims the benefit of priority to Japanese Application No. 2014-211346, filed Oct. 16, 2014, the entire contents of which are incorporated herein by reference.

BACKGROUND ART

Since fiber-reinforced composite material made of reinforcing fibers and a matrix resin is lightweight and has excellent mechanical characteristics, it is used in a wide variety of applications, for example, structural material such as that in aircraft, vehicle bodies, ships and buildings, along with sporting goods such as golf shafts, fishing rods and tennis rackets.

Various methods are available for manufacturing fiber-reinforced composite material. Among them, a widely employed method is to use a sheet-, tape- or string-shaped prepreg, which is an intermediate made by impregnating a matrix resin composition into a reinforcing fiber material. A molded article is obtained by laminating multiple prepregs and by applying heat on the prepreg laminate.

As a matrix resin composition for forming a prepreg, either thermosetting or thermoplastic resins may be used, but thermosetting resin is used more often.

When fiber-reinforced composite material is manufactured by using a prepreg, the amount of resin flow is often the issue. Namely, if the viscosity of a matrix resin composition is lowered so that the matrix resin composition is sufficiently impregnated into a reinforcing fiber material, a significant amount of the matrix resin composition may flow out when the obtained prepreg is thermally compressed during a molding process. Accordingly, problems may arise such as poor appearance of the molded article and meandering reinforcing fibers that in turn cause reduced physical properties. By contrast, if the viscosity of a matrix resin composition is increased so that the amount of resin flow is appropriately controlled, such a viscosity level tends to cause a decrease in the results of impregnation into the reinforcing fiber material and the drapability of the resultant prepreg.

Patent Literature 1 proposes a composition for heat-compression molding; the composition is formed using a core-shell type copolymer so as to increase its viscosity by applying heat.

CITATION LIST

Patent Literature

Patent Literature 1: JP H11-181245A

SUMMARY OF THE INVENTION

Problems to be Solved by the Invention

However, the matrix resin composition in the molding material described in Patent Literature 1 has a significantly low viscosity at normal temperature, and thus when the material is used for forming a prepreg, the shape of the prepreg cannot be maintained.

Moreover, when the molding method of Patent Literature 1 is used, the cost is rather high because the method requires a step for increasing viscosity by preparing a heated atmosphere in a certain apparatus and by leaving the molding material in the apparatus for a predetermined duration. In addition, since the content of a core-shell type copolymer is set in such an amount that enables the molding material with an increased viscosity to be securely released from the polypropylene film, it is difficult to control the amount of resin flow at a desired level for a heat-compression molding process.

Meanwhile, to achieve an appropriate amount of resin flow, a known method is to dissolve a thermoplastic resin or to include a resin with a relatively high molecular weight in the matrix resin composition so as to control the viscosity of the composition. However, it is difficult to achieve all of the features, such as excellent results from impregnating the matrix resin composition into a reinforcing fiber material, high drapability of the obtained prepreg, and an appropriate amount of resin flow during the molding process.

The objective of the present invention is to provide a resin composition with excellent results of impregnation into a reinforcing fiber material, a prepreg having desired drapability with an appropriate amount of resin flow shown during a molding process, and a compression-molded article with good appearance.

Solutions to the Problems

The inventors of the present invention have conducted intensive studies to solve the aforementioned problems and have completed the present invention.

Namely, the present invention is characterized by the following aspects.

[1] A resin composition, containing epoxy resin (A), a curing agent (B) and vinyl polymer particles (C), in which the content of epoxy resin (a1) with a molecular weight of 100 to 480 is set at 30 to 90 parts by mass in 100 parts by mass of the epoxy resin (A), the content of epoxy resin (a2) with a molecular weight of 2000 to 40000 is set at 10 to 70 parts by mass in 100 parts by mass of the epoxy resin (A), the content of the vinyl polymer particles (C) is set at 2 to 30 parts by mass per 100 parts by mass of the epoxy resin (A), and the maximum value of instantaneous increase in viscosity of the vinyl polymer particles (C) is 0.3 to 5.0 Pa·s/° C.

[2] The resin composition according to [1], in which the viscosity at 30° C. is $1.0 \times 10^2$ to $1.0 \times 10^5$ Pa·s, and the minimum viscosity measured at a rate of temperature rise of 2° C./min. is 0.8 to 10 Pa·s.

[3] A resin composition, containing epoxy resin (A), a curing agent (B) and vinyl polymer particles (C), in which the viscosity at 30° C. is $1.0 \times 10^2$ to $1.0 \times 10^5$ Pa·s, the minimum viscosity measured at a rate of temperature rise of 2° C./min. is 0.8 to 10 Pa·s, the content of the vinyl polymer particles (C) is 2 to 30 parts by mass per 100 parts by mass of the epoxy resin (A), and the maximum value of instantaneous increase in viscosity of the vinyl polymer particles (C) is 0.3 to 5.0 Pa·s/° C.

[4] The resin composition according to any of [1]~[3], in which the vinyl polymer particles (C) are structured to be core-shell particles having a core layer and shell layer both made of acrylic resin.

[5] The resin composition according to [4], in which the glass transition temperature of the shell layer of the core-shell particles is 85 to 115° C., the value of solubility parameter (SP value) is 20.20 to 20.50 $[(J/cm^3)^{1/2}]$, and the mass ratio of the core layer and shell layer is set to be core:shell=90:10~50:50.

[6] The resin composition according to any of [1]~[3], in which the vinyl polymer particles (C) are obtained by conducting two or more stages of emulsion polymerization on vinyl monomer mixtures having different compositions, and by spray-drying the emulsion of the vinyl polymer.

[7] The resin composition according to [6], in which the vinyl monomer mixtures having different compositions are set to have monomers selected from a group consisting of (meth)acrylates that may have a functional group and (meth) acrylic acids.

[8] The resin composition according to [6] or [7], in which the glass transition temperature of the outermost emulsion-polymerized layer (i) of the vinyl polymer particles (C) is 85 to 115° C., the value of solubility parameter (SP value) is 20.20 to 20.50 $[(J/cm^3)^{1/2}]$, and the mass ratio of the outermost emulsion-polymerized layer (i) and the other emulsion-polymerized layer (ii) is set to be (i):(ii)=90:10~50:50.

[9] The resin composition according to any of [1]~[8], in which the average particle diameter of the vinyl polymer particles (C) is 0.5 μm to 1.0 μm.

[10] The resin composition according to any of [1]~[9], in which the curing agent (B) contains at least one of an imidazole compound, dicyandiamide and a boron trichloride amine complex.

[11] A prepreg made of the resin composition according to any of [1]~[10] and a reinforcing fiber material.

[12] A prepreg laminate, formed by laminating multiple sheets of any prepreg, in which a layer containing the resin composition according to any of [1]~[10] is further laminated on at least either outermost layer.

[13] A prepreg laminate, formed by laminating multiple sheets of any prepreg, in which a prepreg layer of fiber-reinforced non-woven fabric, made by impregnating the resin composition according to any of [1]~[10] into a fiber-reinforced non-woven fabric with a fiber basis weight of 5 to 50 g/m$^2$, is further laminated on at least either outermost layer.

[14] A prepreg laminate according to [12] or [13], in which the prepreg of any type is the prepreg described in [11].

[15] A molded article formed by compression molding the prepreg described in [11].

[16] A molded article formed by compression molding the prepreg laminate described in any of [12]~[14].

The present invention is characterized by other aspects as follows.

(1) A resin composition, containing epoxy resin (A), a curing agent (B) and vinyl polymer particles (C), in which the content of epoxy resin (a1) with a molecular weight of 100 to 480 is set at 30 to 90 parts by mass in 100 parts by mass of the epoxy resin (A), and the content of the vinyl polymer particles (C) is set at 2 to 30 parts by mass per 100 parts by mass of the epoxy resin (A).

(2) The resin composition according to (1), in which the vinyl polymer particles (C) are structured to be core-shell particles having a core layer and shell layer both made of acrylic resin.

(3) The resin composition according to (1) or (2), in which the content of epoxy resin (a2) with a molecular weight of 2000 to 40000 is set at 10 to 50 parts by mass in 100 parts by mass of the epoxy resin (A).

(4) The resin composition according to any of (1)~(3), in which the viscosity at 30° C. is $1.0 \times 10^2$ to $1.0 \times 10^5$ Pa·s, and the minimum viscosity measured at a rate of temperature rise of 2° C./min. is 1.0 to 50 Pa·s.

(5) A prepreg made of the resin composition according to any of (1)~(4) and a reinforcing fiber material.

(6) The prepreg according to (5) above, in which the resin flow rate is 4.5 mass % or lower when it is formed into a compression-molded plate by compression-molding under conditions of surface pressure set at 8 MPa, die temperature at 140° C. and molding time of 5 minutes.

(7) A prepreg laminate, formed by laminating multiple sheets of any prepreg, in which a layer made of the resin composition according to any of (1)~(4) is further laminated on at least either outermost layer.

(8) A prepreg laminate, formed by laminating multiple sheets of any prepreg, in which a prepreg layer of fiber-reinforced non-woven fabric, made by impregnating the resin composition according to any of (1)~(4) into a fiber-reinforced non-woven fabric to have a fiber basis weight of 5 to 50 g/m$^2$, is further laminated on at least either outermost layer.

(9) The prepreg laminate according to (7) or (8), in which the prepreg of any type is the prepreg described in (5) or (6).

(10) A molded article obtained by compression-molding the prepreg described in (5) or (6).

(11) A molded article obtained by compression-molding the prepreg laminate described in any of (7)~(9).

Effects of the Invention

The present invention relates to a prepreg that exhibits an excellent drapability and an appropriate amount of resin flow during a molding process, to a compression-molded article formed accordingly using the prepreg, and to a resin composition that exhibits excellent results of impregnation into a reinforcing fiber material so as to form the prepreg.

DETAILED DESCRIPTION OF THE EMBODIMENTS

A first embodiment of the present invention is characterized by the following as well as what is obtained by using the same: a resin composition containing epoxy resin (A), a curing agent (B) and vinyl polymer particles (C), in which the content of epoxy resin (a1) with a molecular weight of 100 to 480 is set at 30 to 90 parts by mass in 100 parts by mass of the epoxy resin (A), the content of epoxy resin (a2) with a molecular weight of 2000 to 40000 is set at 10 to 70 parts by mass in 100 parts by mass of the epoxy resin (A), the content of the vinyl polymer particles (C) is set at 2 to 30 parts by mass per 100 parts by mass of the epoxy resin (A), and the maximum value of instantaneous increase in viscosity of the vinyl polymer particles (C) is set at 0.3 to 5.0 Pa·s/° C.

The maximum value of instantaneous increase in viscosity is determined as follows.

First, a sample resin composition is prepared by mixing 100 parts by mass of bisphenol-A epoxy resin with an epoxy equivalent weight of 184 to 194 g/eq. and 10 parts by mass of vinyl polymer particles (C), and then its viscosity is measured by a rheometer, using a 25 mm-diameter parallel plate under conditions of plate gap: 0.5 mm, frequency: 10 rad/sec., rate of temperature rise: 2° C./min., measuring interval: 30 sec., measurement starting temperature: 30° C. and stress: 300 Pa. When the temperature is set as $T_{n+1}$ (° C.) and the viscosity is set as $V_{n+1}$ (Pa·s) at the $(n+1)_{th}$ measurement time, and when the temperature is set as $T_n$ (° C.) and the viscosity is set as $V_n$ (Pa·s) at the $(n)_{th}$ measurement time, then the maximum value of "$A_{n+1}$" obtained by the expression below is determined to be the maximum value of instantaneous increase in viscosity.

$$A_{n+1} = (V_{n+1} - V_n)/(T_{n+1} - T_n)$$

A second embodiment of the present invention is characterized by the following as well as what is obtained by using the same: a resin composition containing epoxy resin (A), a curing agent (B) and vinyl polymer particles (C), in which the viscosity at 30° C. is set at $1.0 \times 10^2$ to $1.0 \times 10^5$ Pa·s, the minimum viscosity measured at a rate of temperature rise of 2° C./min. is set at 0.8 to 10 Pa·s, the content of the vinyl polymer particles (C) is set at 2 to 30 parts by mass per 100 parts by mass of the epoxy resin (A), and the maximum value of instantaneous increase in viscosity of the vinyl polymer particles (C) is set at 0.3 to 5.0 Pa·s/° C.

"Epoxy resin" is referred to as the term for a category of thermosetting resins or for a category of chemical substances having an epoxy group in the molecule. In the present application, the latter is employed. Moreover, an "epoxy resin composition" means a composition that contains epoxy resin and a curing agent, or a composition that may further contain other additives if applicable.

In the present application, "(meth)acrylate" means acrylate or methacrylate. The same definition applies to "(meth)acrylic acid" as well. Also, in the present application, "acrylic resin" means a polymer obtained by polymerizing a monomer selected from a group consisting of later-described (meth)acrylates that may have a functional group and (meth)acrylic acids.

In addition, a cured product of a resin composition may also be referred to as a "cured resin product" in the present application.

The present invention is described below in detail.

(Resin Composition)

A resin composition according to the first or second embodiment of the present invention contains epoxy resin (A), a curing agent (B) and vinyl polymer particles (C).

<Epoxy Resin (A)>

Epoxy resin (A) in the embodiments of the present invention is not limited to a specific type, and may be, for example, glycidyl ether epoxy resin, glycidyl amine epoxy resin, glycidyl ester epoxy resin, alicyclic epoxy resin or the like. Among them, a glycidyl ether or glycidyl amine epoxy resin is preferred because of their reasonable price and availability, excellent water resistance and high reactivity.

Glycidyl ether or glycidyl amine epoxy resin is preferred to contain two or more glycidyl groups in the molecule, considering the heat resistance property of the cured resin product. Examples of such epoxy resins are bisphenol-A epoxy resin, bisphenol F-epoxy resin, novolac epoxy resin and triphenylmethane epoxy resin and the like. Among them, epoxy resin (A) in the embodiments of the present invention is preferred to include a bisphenol-A epoxy resin in view of the heat resistance and toughness properties of the cured resin product.

The epoxy resins listed above may be used alone or in combination thereof.

To easily dissolve or swell later-described vinyl polymer particles (C) in a resin composition related to the present invention, a compound with a relatively low molecular weight is preferred to be contained at a higher content in epoxy resin (A), when the viscosity control of the resin composition is considered.

More specifically, epoxy resin (a1) with a molecular weight of 100 to 480 is preferred to be contained at 30 to 90 parts by mass, more preferably 35 to 80 parts by mass, in 100 parts by mass of epoxy resin (A). Generally, commercially available epoxy resin products are each a mixture of multiple compounds with different polymerization degrees or the like, and its molecular weight is the average value of the compounds in the mixture. By contrast, "molecular weights" of epoxy resins (a1) and (a2) in the embodiments of the present invention are each the value obtained when individual compounds in an epoxy resin product are separated by GPC and analyzed respectively.

By setting a content of epoxy resin (a1) to be at least 30 parts by mass, a prepreg with excellent drapability is obtained, the resin flow from the prepreg containing the resin composition is made appropriate during a compression-molding process, and it is easier to impregnate the resin composition into a reinforcing fiber material when a prepreg is formed. Meanwhile, by setting the content to be no greater than 90 parts by mass, the tack of a prepreg will not be excessive, and it is easier to maintain the shape of the prepreg.

In addition, when the resin composition related to the present invention is used as the matrix resin composition of a prepreg, epoxy resin (A) is preferred to further contain epoxy resin (a2) with a molecular weight of 2000 to 40000 from the viewpoint of viscosity control. The amount of epoxy resin (a2) is not limited specifically unless it reduces the effects of the present invention, but is preferred to be set at 10 to 70 parts by mass, more preferably 10 to 50 parts by mass, even more preferably 12 to 40 parts by mass, in 100 parts by mass of epoxy resin (A). An amount of 10 parts by mass or greater is preferred, since such an amount prevents the viscosity of the resin composition related to the present invention from becoming too low and the tack of a prepreg from becoming too strong, while it is easier to maintain the shape of the prepreg. Meanwhile, an amount of 70 parts by mass or less is preferred since such an amount does not hinder later-described vinyl polymer particles (C) from dissolving or swelling in the resin composition.

Epoxy resin (A) may also contain an epoxy resin other than the above epoxy resins (a1) and (a2) within a range that will not reduce the effects of the present invention. In such a composition, the amount of an epoxy resin other than (a1) or (a2) is usually set at no greater than 60 parts by mass per 100 parts by mass of epoxy resin (A).

<Curing Agent (B)>

Examples of curing agent (B) in the embodiments of the present invention are amine-based, acid anhydride-based (carboxylic anhydrides, or the like), phenol-based (phenolic novolac resins and like), mercaptan-based, Lewis acid-amine complex-based, and onium salt-based curing agents and the like. They may have any structure as long as they are capable of curing epoxy resin (A). Among them, amine-based or Lewis acid-amine complex-based curing agents are preferred because of their excellent storage stability and curing capability. Those curing agents may be used alone or in combination thereof.

Examples of Lewis-acid amine complex-based curing agents are boron halide-amine complexes, in particular, boron trifluoride-amine complexes such as boron trifluoride-piperidine complexes, boron trifluoride-monoethylamine complexes, and boron trifluoride-triethanolamine complexes; boron trichloride amine complexes such as boron trichloride-octyl amine complexes; and the like. Among those Lewis-acid amine complexes, boron trichloride-amine complexes are preferred, since they exhibit excellent solubility in epoxy resin, long pot life when formed into a matrix resin composition, and excellent curability.

Examples of amine-based curing agents are aromatic amines such as diaminodiphenylmethane and diaminodiphenylsulfone, aliphatic amines, imidazole derivatives, dicyandiamide, tetramethylguanidine, thiourea-added polyamine, and their isomers and modified products. Among them, dicyandiamide is preferred because it contributes to excellent storage stability of the prepreg, and imidazole derivatives are especially preferred because they provide high heat resistance.

To enhance the curing activity of curing agent (B), a curing aid may be used. For example, when curing agent (B) is dicyandiamide, the curing aid is preferred to be urea derivatives such as 3-phenyl-1,1-dimethylurea, 3-(3,4-dichlorophenyl)-1,1-dimethylurea (DCMU), 3-(3-chloro-4-methylphenyl)-1,1-dimethyl urea and toluene bis(dimethyl urea). Among them, a combination of dicyandiamide and DCMU is especially preferred.

<Vinyl Polymer Particles (C)>

Vinyl polymer particles (C) related to the present invention mean fine particles obtained by drying a polymer emulsion prepared by polymerizing radically polymerizable vinyl monomers.

Examples of radically polymerizable vinyl monomers are (meth)acrylates such as methyl (meth)acrylate, ethyl (meth)acrylate, n-propyl (meth)acrylate, i-propyl (meth)acrylate, n-butyl (meth)acrylate, t-butyl (meth)acrylate, i-butyl (meth)acrylate, n-hexyl (meth)acrylate, n-octyl (meth)acrylate, 2-ethylhexyl (meth)acrylate, cyclohexyl (meth)acrylate, benzyl (meth)acrylate, phenyl (meth)acrylate, nonyl (meth)acrylate, decyl (meth)acrylate, dodecyl (meth)acrylate, stearyl (meth)acrylate, t-butyl cyclohexyl (meth)acrylate, isobornyl (meth)acrylate, tricyclo [$5.2.1.0^{2.6}$]decan-8-yl-methacrylate, and dicyclopentadienyl (meth)acrylate; aromatic vinyl monomers such as styrene, α-methyl styrene and vinyl toluene; hydroxyl group-containing (meth)acrylates such as hydroxymethyl (meth)acrylate, 2-hydroxyethyl (meth)acrylate, 2-hydroxypropyl (meth)acrylate, 2-hydroxybutyl (meth)acrylate, 4-hydroxybutyl (meth)acrylate and glycerol mono(meth)acrylate; functional group (other than hydroxyl group)-containing (meth)acrylates such as glycidyl (meth)acrylate, N,N-dimethylaminoethyl (meth)acrylate and N-methyl-2,2,6,6-tetramethyl-piperidyl (meth)acrylate; carboxyl group-containing vinyl monomers such as acrylic acid, methacrylic acid, crotonic acid, maleic acid, itaconic acid, fumaric acid, isocrotonic acid, salicylic acid, vinyloxy acetic acid, allyloxy acetic acid, 2-(meth)acryloyl propanoic acid, 3-(meth)acryloyl butanoic acid and 4-vinylbenzoic acid; vinyl cyanide monomers such as (meth)acrylonitrile; (meth)acrylamide; itaconic acid esters such as monomethyl itaconate, monoethyl itaconate, monopropyl itaconate, monobutyl itaconate, dimethyl itaconate, diethyl itaconate, dipropyl itaconate and dibutyl itaconate; fumaric acid esters such as monomethyl fumarate, monoethyl fumarate, monopropyl fumarate, monobutyl fumarate, dimethyl fumarate, diethyl fumarate, dipropyl fumarate and dibutyl fumarate; maleic acid esters such as monomethyl maleate, monoethyl maleate, monopropyl maleate, monobutyl maleate, dimethyl maleate, diethyl maleate, dipropyl maleate and dibutyl maleate; other vinyl monomers such as vinylpyridine, vinyl alcohol, vinyl imidazole, vinylpyrrolidone, vinyl acetate and 1-vinylimidazole; and the like. Those monomers may be used alone or in combination thereof.

Among the monomers listed above, (meth)acrylates that may have a functional group or (meth)acrylic acids are preferred since it is easier to conduct radical polymerization and emulsion polymerization. Here, "(meth)acrylates that may have a functional group" are collectively referred to as above-listed (meth)acrylates, hydroxyl group-containing acrylates and functional group (other than hydroxyl group)-containing (meth)acrylates.

Vinyl polymer particles (C) are manufactured by polymerizing the above vinyl monomers with additives, if applicable, such as a polymerization initiator, emulsifier, dispersion stabilizer, chain transfer agent and the like. A polymerization initiator, emulsifier, dispersion stabilizer, chain transfer agent and the like may be selected from known materials, for example, those described in PCT publication WO2010/090246 or the like.

As for a polymerization method, emulsion, soap-free emulsion, swelling, mini-emulsion, dispersion or fine suspension polymerization is preferred since such methods make it easier to obtain spherical particles and to control particle morphology. Among them, soap-free emulsion polymerization is preferred, since the obtained polymer exhibits excellent dispersibility. In addition, to control the internal morphology of vinyl polymer particles, an industrially highly practical method is conducted by, for example, dropping vinyl monomer mixtures having different compositions consecutively in multiple stages.

Namely, vinyl polymer particles (C) are preferred to be those obtained by conducting two or more stages of emulsion polymerization on vinyl monomer mixtures having different compositions, and by spray-drying the emulsion of the vinyl polymer (hereinafter may also be referred to as "multi-stage polymer particles"). Here, vinyl monomer mixtures having different compositions are preferred to be made of monomers selected from a group consisting of (meth)acrylates that may have a functional group and (meth)acrylic acids.

Vinyl polymer particles (C) formed as above are preferred to be core-shell particles. Namely, vinyl polymer particles (C) are preferred to be core-shell particles where the core layer and shell layer are both made of acrylic resin. To determine if vinyl polymer particles have a core-shell structure, for example, it is necessary to satisfy the following conditions at the same time: growth of the particle diameter of polymer particles sampled during a polymerization process is confirmed; and change in the minimum film-forming temperature (MFT) and solubility in various solvents are confirmed in polymer particles sampled during a polymerization process. Alternatively, it is an option to observe a section of the polymer by a transmission electron microscope (TEM) for confirming the presence of a concentric structure, or to observe a frozen-fractured section of the polymer by a scanning electron microscope (Crio SEM) for confirming the presence of a concentric structure.

Vinyl polymer particles (C) related to the present invention are observed as particles in a resin composition at normal temperature (10 to 30° C.), but are dissolved in or swollen by the resin composition, in particular, epoxy resin (A) at a higher temperature.

Namely, since vinyl polymer particles (C) are observed as particles in a resin composition at normal temperature, that is, at a relatively low temperature, the viscosity does not become excessively high. Therefore, the resin composition is impregnated sufficiently into a reinforcing fiber material, and the resultant prepreg exhibits excellent drapability accordingly. On the other hand, vinyl polymer particles (C) are dissolved in or swollen by epoxy resin (A) at a higher temperature in the resin composition. When the prepreg is compression-molded, vinyl polymer particles (C) are dissolved in or swollen by epoxy resin (A) prior to the reaction of epoxy resin (A) and curing agent (B). Accordingly, the resin composition is thickened to have a higher viscosity, thereby resulting in a smaller amount of resin flow.

Vinyl polymer particles (C) are preferred to be such a type that are not dissolved in or swollen by epoxy resin (A) at a temperature for preparing a resin composition related to the present invention, or at a temperature for forming a prepreg using the resin composition, but are dissolved in or swollen by epoxy resin (A) prior to the reaction of epoxy resin (A) and curing agent (B) when the temperature is raised for molding a prepreg.

More specifically, vinyl polymer particles (C) are preferred to be selected from those that start dissolving in or swelling by epoxy resin (A) in a temperature range of 60 to 140° C., more preferably 80 to 120° C.

The rate of dissolving or swelling of vinyl polymer particles (C) is indicated by the maximum value of instantaneous increase in viscosity. The maximum value of instantaneous increase in viscosity in the present application means the maximum value of instantaneous increase in viscosity "$A_{n+1}$" measured as follows.

(Measuring Maximum Value of Instantaneous Increase in Viscosity)

First, a sample resin composition is prepared by mixing 100 parts by mass of bisphenol-A epoxy resin with an epoxy equivalent weight of 184 to 194 g/eq. and 10 parts by mass of vinyl polymer particles (C), and then its viscosity is measured by a rheometer, using a 25 mm-diameter parallel plate under conditions of plate gap: 0.5 mm, frequency: 10 rad/sec., rate of temperature rise: 2° C./min., measuring interval: 30 sec., starting measurement temperature: 30° C. and stress: 300 Pa. When the temperature is set as $T_{n+1}$ (° C.) and the viscosity is set as $V_{n+1}$ (Pa·s) at the $(n+1)_{th}$ measurement time, and the temperature is set as $T_n$ (° C.) and the viscosity is set as $V_n$ (Pa·s) at the $(n)_{th}$ measurement time, the maximum value of "$A_{n+1}$" obtained by the expression below is determined to be the maximum value of instantaneous increase in viscosity.

$$A_{n+1}(V_{n+1}-V_n)/(T_{n+1}-T_n)$$

The maximum value of instantaneous increase in viscosity of vinyl polymer particles (C) related to the present invention is preferred to be 0.3 to 5.0 Pa·s/° C., more preferably 0.4 to 4.5 Pa·s/° C., even more preferably 0.5 to 3.0 Pa·s/° C.

[Molded Article]

If the maximum value of instantaneous increase in viscosity is 0.3 Pa·s/° C. or higher, the viscosity of a resin composition increases quickly in the heating step of a molding process, and an excessive resin flow is thereby prevented. As a result, problems such as poor appearance of the molded article caused by meandering of reinforcing fibers contained in the molded article, and formation of a resin-starved area caused by insufficiently filled resin in a die are prevented. On the other hand, if the maximum value of instantaneous increase in viscosity is 5.0 Pa·s/° C. or lower, the viscosity of a resin composition increases slowly in the heating step of a molding process. Accordingly, resin is sufficiently filled, preventing problems such as poor appearance caused when the uneven surface of a prepreg is reflected on the surface of the molded article, formation of voids in the molded article, and the like.

The above conditions are easier to satisfy when the aforementioned multi-stage polymer particles or core-shell particles are used as vinyl polymer particles (C). Especially preferred are multi-stage polymer particles obtained by using, as aforementioned "vinyl monomer mixtures having different compositions", mixtures of monomers selected from a group consisting of (meth)acrylates that may have a functional group and (meth)acrylic acids, or core-shell particles in which the core and shell layers are both made of acrylic resin.

Multi-stage polymer particles or core-shell particles are more likely to be dissolved in or swollen by epoxy resin (A) that has a smaller molecular weight.

More specifically, it is preferred to use epoxy resin (a1) with a molecular weight of 100 to 480, since such epoxy resin efficiently dissolves or swells multi-stage polymer particles or core-shell particles. When a chemical compound has a molecular weight of 100 or greater, volatility is not too high, and handling is thereby easier. Also, since the viscosity is not so low, the shape retention property is maintained in a resultant prepreg. When the molecular weight is 480 or lower, dissolving or swelling of multi-stage polymer particles or core-shell particles is not hindered, and the resin flow is effectively suppressed during a compression-molding process. The molecular weight of epoxy resin (a1) is more preferred to be 150 to 480.

During a compression-molding process of the later-described prepreg (namely, a prepreg obtained by impregnating the resin composition of the present invention into a reinforcing fiber material), to sufficiently express the effect of suppressing the resin flow, multi-stage polymer particles or core-shell particles are preferred to be dissolved in or swollen by epoxy resin (A) at a temperature lower than that for curing epoxy resin (A). The degree of dissolution or swelling of those particles is affected by the glass transition temperature and solubility parameter (SP value) of the resin present on the outermost emulsion-polymerized layer of multi-stage polymer particles (hereinafter may also be referred to as the "layer (i)") or the shell layer of core-shell particles; and the mass ratio of the core layer to the shell layer, or of the layer (i) of the multi-stage polymerized particles to the other emulsion-polymerized layer (hereinafter may also be referred to as the layer (ii)).

The higher the glass transition temperature of the layer (i) or shell layer, or the higher the SP value of the particles, the less likely are the particles to be dissolved in or swollen by the resin. The greater the mass ratio of the shell layer to the core layer, or the greater the mass ratio of the layer (i) to the layer (ii), the less likely are the particles to be dissolved in or swollen by the resin. Particles most preferable to the desired molding temperature are selected in consideration of the above.

For example, when compression-molding is carried out at 140° C., preferably selected are vinyl polymer particles (C) structured to be core-shell particles having a glass transition temperature of the shell layer set at 85 to 115° C., the SP value of the shell layer at 20.20 to 20.50 [(J/cm$^3$)$^{1/2}$], and the mass ratio of core to shell at core:shell=90:10 to 50:50. Alternatively, preferably selected are vinyl polymer particles (C) made of multi-stage particles having a glass transition temperature of the outermost emulsion-polymerized layer (i) set at 85 to 115° C., the SP value at 20.20 to 20.50 [(J/cm$^3$)$^{1/2}$], the mass ratio of the outermost emulsion-polymerized layer (i) to the other emulsion-polymerized layer (ii) at (i):(ii)=90:10 to 50:50.

Each SP value is measured by assigning in expression (1) below the SP value (Sp (Ui)) of a monomer, which is the monomer unit of a polymer as described in PCT publication WO2013/077293. The Sp (Ui) may be obtained by the Fedros method described in Polymer Engineering and Science, Vol. 14, 147 (1974).

[math 1]
$$Sp \text{ value} = \sum_{i=1}^{n} (Mi \times Sp(Ui)) \quad (1)$$

In the expression (1) above, "Mi" indicates the molar fraction of component (i) of a monomer unit, and $\Sigma Mi=1$.

The average particle diameter of vinyl polymer particles (C) related to the present invention is preferred to be 0.5 to 1.0 μm, more preferably 0.6 to 0.9 μm, even more preferably 0.6 to 0.8 μm. Here, the average particle diameter means the volume mean diameter of 100 primary particles measured by a scanning electron microscope. By setting the average particle diameter at 0.5 μm or greater, the viscosity increase rate will not be too high, the amount of resin flow is controlled appropriately during a molding process, and the matrix resin composition is thereby sufficiently filled in a die. Accordingly, a resin-starved area is not formed, the uneven prepreg surface is not reflected on the surface of the molded article, and formation of voids is suppressed in the molded article.

On the other hand, when the average particle diameter is set at 1.0 μm or smaller, the viscosity increase rate will not be too slow, and the amount of resin flow is appropriate during a molding process. As a result, formation of a resin-starved area and meandering of reinforcing fibers are suppressed, and a molded article thereby shows excellent appearance.

In addition, the thickening starting temperature is preferred to be 70 to 90° C. for vinyl polymer particles (C).

The thickening starting temperature is measured as follows.

First, a sample resin composition is prepared by mixing 100 parts by mass of bisphenol-A epoxy resin with an epoxy equivalent weight of 184 to 194 g/eq. and 10 parts by mass of vinyl polymer particles, and then its viscosity is measured by a rheometer, using a 25 mm-diameter parallel plate under conditions of plate gap: 0.5 mm, frequency: 10 rad/sec., rate of temperature rise: 2° C./min., starting measurement temperature: 30° C., and stress: 300 Pa. From the viscosity-temperature curve, the minimum viscosity that appears shortly before the start of viscosity increase is obtained and set as the thickening starting temperature.

When the thickening starting temperature is 70° C. or higher, the amount of resin flow is appropriate when heated during a molding process, and the matrix resin composition is sufficiently filled in a die. Accordingly, the uneven surface of the prepreg is not reflected on the surface of a molded article, while formation of voids is prevented in the molded article.

On the other hand, if it is 90° C. or lower, the resin flow is not excessive, no resin-starved area is formed in a molded article, and reinforcing fibers are less likely to meander in a molded article, and a molded article with excellent appearance is thereby obtained. The thickening starting temperature is more preferred to be 75° C. to 90° C.

The description provided above makes it easier for a person skilled in the art to obtain vinyl polymer particles (C). That is, based on the above description, or by referring to WO2010/090246 and WO2013/077293, it is easier for the person skilled in the art to adjust the average particle diameter (the volume mean diameter of primary particles), Tg and Sp values and the like so as to obtain vinyl polymer particles (C) having a maximum value of instantaneous increase in viscosity and a thickening starting temperature that are in the above ranges.

The amount of vinyl polymer particles (C) to be added is not specifically limited, but it is preferred to be 2 to 30 parts by mass, more preferably 3 to 20 parts by mass, even more preferably 5 to 15 parts by mass, per 100 parts by mass of epoxy resin (A). An amount of 2 parts by mass or greater is sufficiently effective in suppressing resin flow during a compression-molding process, while an amount of 30 parts by mass or less is effective in maintaining the mechanical characteristics and heat resistance of the molded article.

<Optional Component>

Any optional component may be contained in the resin composition related to the present invention unless it reduces the effects of the present invention. Examples are thermoplastic elastomers, elastomer fine particles or core-shell type elastomer fine particles other than vinyl polymer particles (C), diluents, inorganic particles of silica or the like, carbonaceous components such as carbon nanotubes, flame retardants such as phosphorus compounds, defoaming agents or the like. However, they are not the only options.

<Viscosity of Resin Composition>

The viscosity at 30° C. of the resin composition related to the present invention is preferred to be $1.0 \times 10^2$ to $1.0 \times 10^5$ Pa·s, more preferably $5.0 \times 10^2$ to $9.8 \times 10^4$ Pa·s, even more preferably $1.0 \times 10^3$ to $9.7 \times 10^4$ Pa·s.

Setting the viscosity at $1.0 \times 10^2$ Pa·s or higher is preferred, since handling is easier, which in turn makes it easier to form a prepreg and to carry out processing such as molding. Setting the viscosity at $1.0 \times 10^5$ Pa·s or lower is preferred, because, as described later, it is easier to impregnate the resin composition into a reinforcing fiber material for forming a prepreg under conditions that do not require excessively high heat. In addition, such a viscosity range is preferred for maintaining the drapability of the prepreg.

In a viscosity measuring method conducted at a rate of temperature rise of 2° C./min on a resin composition related to the present invention, the minimum viscosity is preferred to be 0.8 to 10 Pa·s, more preferably 0.8 to 8.0 Pa·s, even more preferably 0.8 to 7.0 Pa·s.

A minimum viscosity of 0.8 Pa·s or higher suppresses excessive resin flow and prevents surface unevenness, that is, it prevents poor appearance of fiber reinforced composite material. Also, a minimum viscosity of 10 Pa·s or lower makes the rate of resin flow appropriate, and the resin composition is sufficiently filled in a die during a compression-molding process using the prepreg.

<Method for Manufacturing Resin Composition>

The resin composition related to the present invention is produced by any conventional method as long as each component is kneaded and homogeneously dispersed or dissolved.

For example, components for forming the resin composition may be mixed simultaneously, or a master batch may be prepared in advance by appropriately dispersing curing agent (B), vinyl polymer particles (C) and other additives into epoxy resin (A). Especially, to homogeneously disperse vinyl polymer particles (C) in epoxy resin (A), it is preferred to prepare a master batch containing vinyl polymer particles (C) at a high concentration rate, and later to add other components into the master batch. In addition, if shearing heat or the like is generated during kneading and the internal temperature of the reaction system is increased, it is preferred to adjust the kneading rate to cool the kneading pot with water or the like so as to prevent a temperature rise during kneading. Examples of a kneading apparatus are a grinding machine, attritor, planetary mixer, dissolver, three-roll mill, kneader, universal blender, homogenizer, homodispenser, ball mill, beads mill and the like. They may be used alone or in combination thereof.

(Prepreg)

The prepreg related to the present invention is made of a reinforcing fiber material and the aforementioned resin composition related to the present invention. The volume of reinforcing fibers is normally 30 to 80 vol %, and preferably 40 to 70 vol %. It is preferred to set the volume to be at least the above lower limit, because such a volume enhances the mechanical characteristics of fiber-reinforced molded composite material. It is also preferred to set the volume to be no greater than the above upper limit, because it is easier to impregnate the resin composition into a reinforcing fiber material during the process for forming a prepreg.

Since the prepreg related to the present invention contains the aforementioned resin composition, it is easier to control the resin flow rate during a molding process. It is more preferred to have a resin flow rate of 4.5 mass % or lower when a compression-molded plate is formed under conditions of surface pressure set at 8 MPa, die temperature at 140° C., and molding time of 5 minutes. More specifically, the prepreg related to the present invention is preferred to be unidirectional, and has a resin flow rate of 4.5 mass % or lower when measured by the following method.

First, a prepreg is prepared to have a fiber content of 240 to 290 g/m$^2$ and a resin content of 28.0 to 32.0 mass %, and the prepreg is cut into a sheet of 298 mm (parallel to fiber)×298 mm (perpendicular to fiber). Then, a prepreg laminate is formed by unidirectionally laminating five plies. The mass of the prepreg laminate is set as "M0." The laminate is compression-molded under conditions of surface pressure set at 8 MPa, die temperature at 140° C., and molding time of 5 minutes, and the mass of the compression-molded plate without burrs is set as "M1." The value, namely the resin flow rate (%), calculated by the expression below is preferred to be 4.5 mass % or lower.

$$\text{flow rate (\%)} = (M0 - M1)/M0 \times 100$$

The resin flow rate is preferred to be set at 4.5 mass % or lower, because a molded article is obtained to have a smooth even surface, and there is no need to put in extra work to remove the resin that is flowed out.

The resin flow rate is preferred to be 1.0 mass % or higher, because it is easier to sufficiently fill the resin composition in a die. By setting the resin flow rate to be 1.0 mass % to 4.5 mass %, the flow of the resin composition and reinforcing fibers in the prepreg is suppressed during the molding process. Accordingly, it is easier to obtain a molded article with excellent appearance.

(Reinforcing Fiber Material)

Based on the usage purposes of the fiber-reinforced composite material to be formed using a prepreg that contains the fiber material, various materials may be used for the reinforcing fiber material related to the present invention. Specific examples are carbon fibers, graphite fibers, aramid fibers, silicon carbide fibers, alumina fibers, boron fibers, tungsten carbide fibers, glass fibers and the like. They may be used alone or in combination thereof. Among them, carbon fibers or graphite fibers are preferred because they have excellent specific tensile strength and a specific modulus of elasticity.

As for carbon fibers and graphite fibers, carbon fibers with a high degree of tensile elasticity of 1.5% or greater are preferred to express strength in a fiber-reinforced composite material.

The shape of the reinforcing fiber material may vary; for example, a shape formed by unidirectionally aligning continuous fibers; a woven fabric by using continuous fibers as warp and weft; a shape formed by unidirectionally aligning tows and holding them with auxiliary weft yarns; a multi-axial warp knit formed by laminating multiple unidirectional reinforcing fiber sheets in different directions and by holding the sheets with auxiliary yarns; a non-woven fabric; or the like. Among them, considering the ease of manufacturing prepregs, preferred are a shape formed by unidirectionally aligning continuous fibers; a woven fabric by using continuous fibers as warp and weft; a shape formed by unidirectionally aligning tows and holding them with auxiliary weft yarns; and a multi-axial warp knit formed by laminating multiple unidirectional reinforcing fiber sheets in different directions and holding them with auxiliary yarns. To express strength in a fiber-reinforced composite material, it is more preferred to use a shape formed by unidirectionally aligning continuous fibers.

The basis weight of a reinforcing fiber material may be determined according to the usage purposes of fiber-reinforced composite material, but practically it is preferred to be 50 to 2000 g/m$^2$. To form a prepreg with excellent results of the impregnation of a resin composition, the basis weight is preferred to be 50 to 600 g/m$^2$, more preferably 50 to 300 g/m$^2$.

(Method for Manufacturing Prepreg)

The prepreg related to the present invention is manufactured by a known method. For example, a predetermined amount of the resin composition related to the present invention is coated on a surface of material such as release paper used during a processing step, a reinforcing fiber material is supplied on the surface, and the layered materials are passed through compression rolls so that the resin composition is impregnated into the reinforcing fiber material. Alternatively, after a predetermined amount of resin composition is directly coated on a reinforcing fiber material, the reinforcing fiber material is sandwiched between release papers or the like, if applicable, which are then passed through compression rolls so that the resin composition is impregnated into the reinforcing fiber material.

(Prepreg Laminate)

For compression-molding a prepreg, a prepreg laminate made by laminating multiple sheets of prepreg is usually used. The prepreg laminate related to the present invention is made by laminating multiple sheets of any prepreg, and a layer containing the resin composition related to the present invention is further laminated on at least either outermost layer. Providing such a layer on the outermost layer is preferred because such a layer contributes to enhancing the appearance of the molded article formed by compression-molding the prepreg laminate. Specific examples of a layer containing the resin composition related to the present invention are a layer formed with the resin composition, and a prepreg layer of a fiber-reinforced non-woven fabric formed by impregnating the resin composition into a fiber-reinforced non-woven fabric with a basis weight of 5 to 50 g/m$^2$ (hereinafter simply referred to as a "prepreg layer of fiber-reinforced non-woven fabric").

On the outermost layer of a prepreg laminate which makes contact with a molding die, it is preferred to provide a prepreg layer of fiber-reinforced non-woven fabric, because the anti-shock property of the molded article is improved. In the prepreg laminate related to the present invention, the prepreg other than the prepreg layer of fiber-reinforced non-woven fabric may be a prepreg related to the present invention or any other prepreg. However, using the prepreg of the present invention is preferred in view of the properties provided by the prepreg related to the present invention.

A relatively thin fiber-reinforced non-woven fabric is preferred, usually having an approximate basis weight of 5 $g/m^2$ to 50 $g/m^2$, preferably 5 $g/m^2$ to 30 $g/m^2$.

A basis weight of at least the above lower limit is preferred, as it enhances the anti-shock property of the fiber-reinforced composite material obtained by using such a material. Also, such a basis weight makes it easier to handle the fiber-reinforced non-woven fabric itself, since tearing or wrinkling rarely occurs. In addition, a basis weight of no greater than the above upper limit is preferred, because such a basis weight does not impair the mechanical characteristics of the fiber-reinforced composite material obtained by compression-molding the prepreg laminate. An approximate basis weight of the resin composition contained in the prepreg layer of fiber-reinforced non-woven fabric is usually 30 to 300 $g/m^2$, preferably 50 to 200 $g/m^2$. Setting the basis weight to be at least the above lower limit is preferred, because a resin layer with a sufficient thickness is formed on the surface of a fiber-reinforced composite material obtained by compression-molding the prepreg, resulting in a molded article with good appearance. Also, setting the basis weight to be no greater than the upper limit is preferred, as it suppresses a decrease in the physical properties of the fiber-reinforced composite material obtained by compression-molding.

As for reinforcing fibers to form a fiber-reinforced non-woven fabric, examples are carbon fibers, graphite fibers, aramid fibers, silicon carbide fibers, alumina fibers, boron fibers, tungsten carbide fibers, glass fibers and the like. They may be used alone or in combination thereof. Among them, glass fibers are preferred because they are reasonably priced and have a small linear expansion coefficient.

(Manufacturing Molded Article)

The molded article related to the present invention is obtained by compression-molding a prepreg or a prepreg laminate described above.

A die to be used for a compression-molding process is not limited to any specific type as long as it is capable of curing the prepreg related to the present invention under high temperature and high pressure conditions. It is preferred to use a die with a structure capable of maintaining its interior to be airtight when the die is closed. Here, airtight means that substantially no epoxy resin composition for forming a molded article leaks from the die when a sufficient amount of molding material is filled in the die and compressed accordingly.

Examples of dies capable of maintaining airtight interiors are those having a shear edge structure or rubber sealing structure on the portions where upper and lower members (male and female members) make contact with each other when the die is closed. In addition, conventionally known dies with any structure may be used as long as they are capable of maintaining airtight interiors.

EXAMPLES

The present invention is described below in detail by referring to the examples. However, the present invention is not limited to those examples.

The following list shows materials used for resin compositions and prepregs.

(Raw Materials)

<Epoxy Resin (A)>
"jER 828" (product name, made by Mitsubishi Chemical Corporation, liquid-type bisphenol-A epoxy resin)
"jER 834" (product name, made by Mitsubishi Chemical, semisolid-type bisphenol-A epoxy resin)
"jER 1001" (product name, made by Mitsubishi Chemical, solid-type bisphenol-A epoxy resin)
"jER 1002" (product name, made by Mitsubishi Chemical, solid-type bisphenol-A epoxy resin)
"jER 1009" (product name, made by Mitsubishi Chemical, solid-type bisphenol-A epoxy resin)
"jER 1010" (product name, made by Mitsubishi Chemical, solid-type bisphenol-A epoxy resin)
"modified epoxy resin" (reaction mixture obtained by mixing bisphenol-A epoxy resin (epoxy equivalent weight: 189 g/eq., made by Mitsubishi Chemical, product name: jER 828) and 4,4'-diaminodiphenylsulfone (made by Wakayama Seika Kogyo Co., Ltd., product name: Seika Cure S) at room temperature to have a mass ratio of jER 828/4,4'-diaminodiphenylsulfone=100/9, and then by applying heat to the mixture at 150° C. The main component of the mixture is a reaction product of epoxy resin and an amine compound having at least one sulfur atom in the molecule. Epoxy equivalent weight: 266 g/eq.)

<Curing Agent (B)>
"2PHZ-PW" (product name, made by Shikoku Chemicals Corporation, 2-phenyl-4,5-dihydroxymethylimidazole)
"Hx3742" (product name "Novacure HX-3742", made by Asahi Kasei Corporation, microcapsule imidazole (curing aid))
"Dicy15" (product name "jER cure DICY15", made by Mitsubishi Chemical, dicyandiamide)
"Omicure 24" (product name, made by PTI Japan Corporation, toluenebis(dimethylurea))
"DY9577" (product name "Accelerator DY9577" made by Huntsman Japan Corporation, boron trichloride octylamine)

<Vinyl Polymer Particles (C)>
Later-described polymer particles (P1)~(P3) and acrylic polymer particles 1 were used. The following are raw materials used for manufacturing vinyl polymer particles (C).
MMA: methyl methacrylate, made by Mitsubishi Rayon Co., Ltd.
MAA: methacrylic acid, made by Mitsubishi Rayon
n-BMA: n-butyl methacrylate, made by Mitsubishi Rayon
t-BMA: t-butyl methacrylate, made by Mitsubishi Rayon
2-HEMA: 2-hydroxyethyl methacrylate, made by Mitsubishi Rayon
GMA: glycidyl methacrylate, made by Mitsubishi Rayon
potassium persulfate: special reagent grade, made by Sigma Aldrich Japan, Ltd.
"PELEX OT-P": product name, made by Kao Corporation, sodium dialkyl sulfosuccinate
"PELEX SS-L": product name, made by Kao, sodium alkyl diphenyl ether disulfonate
AIBN: Otsuka Pharmaceutical Company, 2,2'-azobisisobutyronitrile
"EMULGEN 106": product name, made by Kao, polyoxyethylene lauryl ether (Others)
"PES E 2020 P" (product name "ULTRASON E 2020 P, made by BASF, polyether sulfone)

"C-301" (product name "C-301" made by Sumitomo Chemical Company, aluminum hydroxide)

<Reinforcing Fiber Material>
- carbon fiber bundle 1: product name "TR50S15L", made by Mitsubishi Rayon, tensile strength: 4.9 GPa, tensile modulus of elasticity: 240 GPa, number of filaments: 15000, basis weight: 1.0 gm$^2$
- carbon fiber bundle 2: product name "TRW4050L", made by Mitsubishi Rayon, tensile strength: 4.1 GPa, tensile modulus of elasticity: 240 GPa, number of filaments: 50000, basis weight: 3.75 gm$^2$ (Forming Polymer Particles (P1) (Vinyl Polymer Particles (C))

Into a 2 L four-neck flask equipped with a thermometer, nitrogen gas inlet tube, stirrer, dropping funnel and condenser, 584 grams of ion-exchange water was placed, and the dissolved oxygen in the ion-exchange water was displaced by introducing sufficient nitrogen gas for 30 minutes. After the gas flow was turned off, the water temperature was raised to 80° C. while the water was stirred at 200 rpm. When the internal temperature reached 80° C., 26.1 grams of MMA, 19.9 grams of n-BNA, 0.4 grams of potassium persulfate as the polymerization initiator and 19.6 grams of ion-exchange water were added to make a mixture (monomer mixture P1M1), which was polymerized for an hour.

Then, a mixture of 205.5 grams of MMA, 194.5 grams of n-BMA, 3.6 grams of Pelex OT-P, and 200 grams of ion-exchange water, which was prepared in advance (monomer mixture P1M2), was dropped into the above polymerized mixture.

Next, when heat was no longer generated from the polymerization of monomer mixture (P1M2), the mixture was left standing for an hour, to which a monomer mixture prepared in advance (P1M3) (82.7 grams of MMA, 17.3 grams of MAA, 4.0 grams of Pelex OT-P, 4.0 grams of Emulgen 106, and 200 grams of ion-exchange water) was added, and stirred for an hour at 80° C. Accordingly, polymer particle dispersion (P1L1) was obtained.

Polymer particle dispersion (P1L1) was spray-dried using an L-8 spray dryer (made by Ohkawara Kakohki Co., Ltd., inlet temp./outlet temp.=150/65° C., disc rotation speed: 25000 rpm). As a result, polymer particles (P1) were obtained. The average particle diameter of polymer particles (P1) was 0.7 μm.

In polymer particles (P1), the outermost emulsion polymerized layer (i) is a layer formed by polymerizing monomer mixture (P1M3), and the other portion formed by respectively polymerizing monomer mixtures (P1M1) and (P1M2) corresponds to emulsion polymerized layer (ii). The mass ratio of (i):(ii) in polymer particles (P1) was 50:50. The Tg of the outermost emulsion polymerized layer (i) was 108° C., and the SP value was 20.31 $[(J/cm^3)^{1/2}]$.

The maximum value of instantaneous increase in viscosity was 2.6 Pa·s/° C., and the thickening starting temperature was 82° C.

(Forming Polymer Particles (P2) (Vinyl Polymer Particles (C))

Into a 2 L four-neck flask equipped with a thermometer, nitrogen gas inlet tube, stirrer, dropping funnel and condenser, 544 grams of ion-exchange water was placed and the dissolved oxygen in the ion-exchange water was displaced by introducing sufficient nitrogen gas for 30 minutes. After the gas flow was turned off, the water temperature was raised to 80° C. while the water was stirred at 200 rpm. When the internal temperature reached 80° C., 26.1 grams of MMA, 19.9 grams of n-BMA, 0.4 grams of potassium persulfate as the polymerization initiator and 16.0 grams of ion-exchange water were added to make a mixture (monomer mixture P2M1), which was polymerized for an hour.

Then, a mixture of 334.1 grams of MMA, 316.1 grams of t-BMA, 21.7 grams of 2-HEMA, 6.1 grams of Pelex OT-P, and 251.2 grams of ion-exchange water, which was prepared in advance (monomer mixture P2M2), was dropped into the above polymerized mixture.

Next, when heat was no longer being generated from the polymerization of monomer mixture (P2M2), the mixture was left standing for an hour, to which a monomer mixture prepared in advance (P2M3) (77.0 grams of MMA, 3.0 grams of 2-HEMA, 0.8 grams of Pelex OT-P, and 28 grams of ion-exchange water) was added and stirred for an hour at 80° C. Accordingly, polymer particle dispersion (P2L2) was obtained.

Polymer particle dispersion (P2L2) was spray-dried using an L-8 spray dryer (made by Ohkawara Kakohki, inlet temp./outlet temp.=150/65° C., disc rotation speed: 25000 rpm). As a result, polymer particles (P2) were obtained. The average particle diameter of polymer particles (P2) was 0.7 μm.

In polymer particles (P2), the outermost emulsion polymerized layer (i) is a layer formed by polymerizing monomer mixture (P2M3), and the other portion formed by respectively polymerizing monomer mixtures (P2M1) and (P2M2) corresponds to other emulsion polymerized layer (ii). The mass ratio of (i): (ii) in polymer particles (P2) was 10:90. The Tg of the outermost emulsion polymerized layer (i) was 103° C., and the SP value was 20.29 $[(J/cm^3)^{1/2}]$.

The maximum value of instantaneous increase in viscosity was 1.6 Pa·s/° C., and the thickening starting temperature was 79° C.

(Forming Polymer Particles (P3) (Vinyl Polymer Particles (C))

Into a 2 L four-neck flask equipped with a thermometer, nitrogen gas inlet tube, stirrer, dropping funnel and condenser, 544 grams of ion-exchange water was placed, and the dissolved oxygen in the ion-exchange water was displaced by introducing sufficient nitrogen gas for 30 minutes. After the gas flow was turned off, the water temperature was raised to 80° C. while the water was stirred at 200 rpm. When the internal temperature reached 80° C., 26.1 grams of MMA, 19.9 grams of n-BMA, 0.16 grams of potassium persulfate as the polymerization initiator and 20.0 grams of ion-exchange water were added to make a mixture (monomer mixture P3M1), which was polymerized for an hour.

Then, a mixture of 317.4 grams of MMA, 242.6 grams of n-BMA, 4.0 grams of GMA, 4.0 grams of Pelex OT-P, 1.6 grams of Emulgen 106, 0.24 grams of AIBN and 280.0 grams of ion-exchange water, which was prepared in advance (monomer mixture P3M2) and to which 1.6 grams of potassium persulfate as the polymerization initiator and 40.0 grams of ion-exchange water were added, was dropped into the above polymerized mixture.

After the above, when heat was no longer being generated from the polymerization of monomer mixture (P3M2), the mixture was left standing for an hour, to which a monomer mixture prepared in advance (P3M3) (219.1 grams of MMA, 20.9 grams of MAA, 0.9 grams of OTG, 2.4 grams of Pelex OT-P, 2.4 grams of Emulgen 106 and 120 grams of ion-exchange water) was added and stirred to polymerize the mixture for an hour at 80° C.

Then, when heat was no longer being generated from the polymerization of monomer mixture (P3M3), monomer mixture (P3M4) (3.1 grams of MAA and 62.5 grams of ion-exchange water) was added and stirred for an hour at 80° C. Accordingly, polymer particle dispersion (P3L3) was obtained.

Polymer particle dispersion (P3L3) was spray-dried using an L-8 spray dryer (made by Ohkawara Kakohki, inlet temp./outlet temp.=150/65° C., disc rotation speed: 25000 rpm). As a result, polymer particles (P3) were obtained. The average particle diameter of polymer particles (P3) was 0.7 μm.

In polymer particles (P3), the outermost emulsion polymerized layer (i) is a layer formed by polymerizing monomer mixtures (P3M3) and (P3M4); other portions formed when monomer mixtures (P3M1) and (P3M2) were polymerized correspond to other emulsion polymerized layer (ii). The mass ratio of (i): (ii) in polymer particles (P3) was 30:70. The Tg of the outermost emulsion polymerized layer (i) was 111° C., and the SP value was 20.48 $[(J/cm^3)^{1/2}]$.

The maximum value of instantaneous increase in viscosity was 0.7 Pa·s/° C., and the thickening starting temperature was 89° C.

(Forming Acrylic Polymer Particles 1 (Vinyl Polymer Particles (C))

Into a 2 L four-neck flask equipped with a thermometer, nitrogen gas inlet tube, stirrer, dropping funnel and condenser, 1056 grams of ion-exchange water was placed, and the dissolved oxygen in the ion-exchange water was displaced by introducing sufficient nitrogen gas for 30 minutes. After the gas flow was turned off, the water temperature was raised to 70° C. while the water was stirred at 200 rpm. When the internal temperature reached 70° C., 6.4 grams of Pelex SS-L/63.8 grams of ion-exchange water, 0.6 grams of potassium persulfate/48.0 grams of ion-exchange water were added. Furthermore, 200 grams of MMA as the initiator, 2.0 grams of Pelex OT-P, and 16.0 grams of ion-exchange water were added (monomer mixture P4M1), and polymerized for an hour.

Into the above, a mixture of 600 grams of MMA, 6.0 grams of Pelex OT-P and 16.0 grams of ion-exchange water, which was prepared in advance (monomer mixture P4M2), was dropped.

After the above, when heat was no longer being generated from the polymerization of monomer mixture (P4M2), the mixture was left standing at 80° C. for an hour and cooled. Then, a mixture prepared in advance using 0.2 grams of sodium carbonate and 12.0 grams of ion-exchange water was added as a neutralizer. The mixture was stirred at 80° C. for an hour, and polymer particle dispersion (P4L4) was obtained.

Polymer particle dispersion (P4L4) was spray-dried using an L-8 spray dryer (made by Ohkawara Kakohki, inlet temp./outlet temp.=150/65° C., disc rotation speed: 25000 rpm). As a result, acrylic polymer particles 1 were obtained. The average particle diameter of polymer particles (P4) was 0.1 μm.

The Tg of acrylic polymer particles 1 was 105° C., and the SP value was 20.32 $[(J/cm^3)^{1/2}]$.

The maximum value of instantaneous increase in viscosity was 4.6 Pa·s/° C., and the thickening starting temperature was 66° C.

(Preparing Curing-Agent Master Batch)
[Curing-Agent Master Batch 1]

In a vessel, "2PHZ-PW" as a curing agent and "jER 828" were weighed at a mass ratio of 2:3, and were then stirred to be blended. The mixture was further finely blended using a three-roll mill to obtain curing-agent master batch 1.

[Curing-Agent Master Batch 2]

In a vessel, "Dicy 15" as a curing agent, "Omicure 24" as a curing aid and "jER 828" were weighed at a mass ratio of 7:4:12, and were then stirred to be blended. The mixture was further finely blended using a three-roll mill to obtain curing-agent master batch 2.

(Measurement/Evaluation Methods)
<Average Particle Diameter of Vinyl Polymer Particles (C)>

The emulsion of vinyl polymer particles (C) was diluted with ion-exchange water, and the volume mean diameter of primary particles was determined to be the emulsion particle diameter by using a laser diffraction particle size analyzer for obtaining a particle size distribution (LA-910W, made by Horiba Ltd.).

<Method for Measuring Tg of Shell and Core of Vinyl Polymer Particles (C)>

Tg is the value calculated from the FOX expression (2) below. More specifically, when the polymer is a homopolymer, standard analytical values described in "Polymer Data Handbook" compiled by the Society of Polymer Science, Japan, were employed. When the polymer is a copolymer of "n" types of monomers, the Tg value of each monomer was used for calculation. Table 1 shows data values of Tg of typical homopolymers.

[math 2]

$$\frac{1}{Tg+273} = \sum_{i=1}^{n} \frac{Wi}{Tgi+273} \qquad (2)$$

In the expression above, Tg is the glass transition temperature (° C.) of vinyl polymer particles, Tgi is the glass transition temperature (° C.) of component (i) of the homopolymer, and Wi shows the mass ratio of the component (i), and $\Sigma Wi=1$.

TABLE 1

|  | Sp (Ui) $(J/cm^2)^{1/2}$ | Tg ° C. |
|---|---|---|
| MMA | 20.32 | 105 |
| n-BMA | 19.32 | 20 |
| i-BMA | 18.95 | 60 |
| t-BMA | 18.56 | 107 |
| 2-HEMA | 27.55 | 38 |
| St | 20.08 | 100 |
| GMA | 21.96 | 46 |
| MAA | 25.64 | 228 |

<Method for Measuring SP Value of Shell and Core of Vinyl Polymer Particles (C)>

Each SP value was determined by assigning in the following expression (3) the SP value (Sp (Ui)) of the monomer as a repeating unit in a polymer that forms the shell or core. Sp (Ui) was obtained by the Fedors method described in Polymer Engineering and Science, Vol. 14, 147 (1974). The SP values (Sp (Ui)) of monomers representing those often used are shown in Table 1 (as for the SP value of GMA, the value described in JP2000-1633A was employed).

[math 3]

$$Sp \text{ value} = \sum_{i=1}^{n} (Mi \times Sp(Ui)) \qquad (3)$$

In the expression above, Mi shows the molar fraction of component (i) of a monomer unit, and ΣMi=1.

<Measuring Maximum Value of Instantaneous Viscosity Increase>

A sample resin composition was prepared by mixing 100 parts by mass of jER 828 (bisphenol-A epoxy resin with an epoxy equivalent weight of 186 g/eq.) and 10 parts by mass of vinyl polymer particles (C), and its viscosity was measured by a rheometer "VAR-100" (made by TA Instruments LLC) under the conditions below.
  measurement mode: constant stress, stress value of 300 Pa
  frequency: 10 rad/sec.
  plate diameter: 25 mm
  plate type: parallel
  plate gap: 0.5 mm
  plate temperature at measurement starting time: 30° C.
  rate of temperature rise: 2° C./min.
  measuring interval: 30 sec.

When the temperature is set as $T_{n+1}$ (° C.) and the viscosity is set as $V_{n+1}$ (Pa·s) at the $(n+1)_{th}$ measurement time, and the temperature is set as $T_n$(° C.) and the viscosity is set as $V_n$ (Pa·s) at the $(n)_{th}$ measurement time, the maximum value of "$A_{n+1}$" obtained by the expression below is determined to be the maximum value of instantaneous increase in viscosity.

$$A_{n+1}(V_{n+1}-V_n)/(T_{n+1}-T_n)$$

<Measuring Viscosity of Resin Composition>

The viscosity at 30° C. and the minimum viscosity of a resin composition prepared in each of the examples and comparative examples were measured under the conditions below.
  device: rheometer ("VAR-100", made by TA Instruments)
  measurement mode: constant stress, stress value of 300 Pa
  frequency: 10 rad/sec.
  plate diameter: 25 mm
  plate type: parallel
  plate gap: 0.5 mm
  plate temperature at measurement starting time: 30° C.
  rate of temperature rise: 2° C./min.

<Measuring Thickening Starting Temperature>

A sample resin composition was prepared the same as when the maximum value of instantaneous increase in viscosity was determined above. From the viscosity curve associated with the temperature rise, the temperature observed shortly before the start of viscosity increase was determined to be the thickening starting temperature.

<Measuring Resin Flow Rate>

A unidirectional prepreg prepared in each of the examples and comparative examples was cut into a sheet of 298 mm (parallel to fiber)×298 mm (perpendicular to fiber). Then, a prepreg laminate was formed by laminating 5 plies while the fiber direction was aligned. The mass of the prepreg laminate was set as "M0." The laminate was compression-molded under conditions of surface pressure set at 8 MPa, die temperature at 140° C., and molding time of 5 minutes, and the mass of the compression-molded plate article without burrs was set as "M1." The value calculated by the expression below was determined to be the resin flow rate (mass %).

flow rate (%)=(M0−M1)/M0×100

<Fractionating Molecular Weights of Epoxy Resin (A) in Each Product>

The components of epoxy resin (A) in each product were fractionated by GPC under the conditions specified below.

The weight-average molecular weight of each fraction was set as the molecular weight of the fraction, and the mass ratio of the fraction was calculated from the ratio of its peak area to all the peak areas.
  device: HLC-8020 (component system) (made by Tosoh Corporation)
  pump: DP-8020 (2 computer-controlled dual pumps)
  online degasser: SD-8022
  autosampler: AS-8020
  RI detector: RI-8020
  UV detector: UV-8020
  fraction collector: FC-8020
  column conditions: TSK-GEL G3000 (21.5 mm ID×60 cm L)×2 with guard column
  flow rate: 4.0 mL/min. (2.0 mL/min.×2)
  mobile phase: chloroform
  column temperature: room temperature
  injection volume: 1.0 mL
  concentration: 6 mass %

In the epoxy resin (A) used in each of the examples and comparative examples, the content (mass %) of epoxy resin (a1) with a molecular weight of 100 to 480 and the content (mass %) of epoxy resin (a2) with a molecular weight of 2000 to 40000 are shown in Table 2.

TABLE 2

|  | Number-average molecular weight | Content of epoxy resin with molecular weight of 100 to 480 (%) | Content of epoxy resin with molecular weight of 2000 to 40000 (%) |
| --- | --- | --- | --- |
| jER 828 | 370 | 85.9 | 0.0 |
| jER 834 | 470 | 50.1 | 7.9 |
| jER 1001 | 900 | 15.1 | 37.2 |
| jER 1002 | 1650 | 7.0 | 55.9 |
| jER 1009 | 3800 | 0.9 | 95.2 |
| jER 1010 | 5500 | 0.6 | 94.1 |
| Modified epoxy resin | 2400 | 42.5 | 26.6 |

<Appearance of Compression-Molded Article>

The surface of a compression-molded plate was observed after the compression-molding process was completed. When the surface looked excellent, it was evaluated as "A"; when slight lines were observed on the surface along reinforcing fibers, it was evaluated as "B"; and when clear lines were observed on the surface, it was evaluated as "C".

Example 1

In a dissolving vessel, 37 parts by mass of jER 828 and 50 parts by mass of jER 1001 were mixed while the vessel was heated at 80° C., and then cooled to approximately 60° C. Next, 21.7 parts by mass of curing-agent master batch 1 prepared in advance and 5 parts by mass of polymer particles (P1) were added to the vessel and stirred at 60° C. Accordingly, resin composition 1 was obtained.

When the viscosity of resin composition 1 was measured, the viscosity at 30° C. was $2.9 \times 10^3$ Pa·s, and the minimum viscosity was $1.8 \times 10^0$ Pa·s at 87° C.

A resin film was prepared by coating resin composition 1 on a release paper at 60° C. by using a multi-coater M-500, made by Hirano Tecseed Co., Ltd.

Carbon fiber bundle 1 was wound on the resin coated surface of the resin film using a drum winding method, and was sandwiched with the same resin film so that resin composition 1 was impregnated into the fiber bundle.

Accordingly, a unidirectional prepreg was obtained. When the basis weight of the prepreg was measured, the fiber content was 278 g/m$^2$ and the resin content was 28.3% (mass %, the same applies to the following examples).

The amount of resin flow (flow rate (%)) from the prepreg during the compression-molding process was measured. The appearance of the compression-molded article was excellent (evaluated as "A"). The results are shown in Table 3.

Example 2

Resin composition 2 was prepared by employing the same process as in Example 1 except that the amount of polymer particles (P1) was changed to 10 parts by mass.

When the viscosity of resin composition 2 was measured, the viscosity at 30° C. was 2.1×10$^3$ Pa·s, and the minimum viscosity was 2.2×10$^0$ Pa·s at 84° C.

Using resin composition 2 and carbon fiber bundle 1, a prepreg was prepared by employing the same process as in Example 1. When the basis weight of the prepreg was measured, the fiber content was 260 g/m$^2$ and the resin content was 28.7%.

The amount of resin flow (flow rate (%)) from the prepreg during the compression-molding process was measured. The appearance of the compression-molded article was excellent (evaluated as "A"). The results are shown in Table 3.

Example 3

In a dissolving vessel, 57 parts by mass of jER 828, 20 parts by mass of jER 1002, and 10 parts by mass of j ER 1009 were weighed and mixed while the vessel was heated at 150° C., which was then cooled to approximately 60° C. Then, 21.7 parts by mass of curing-agent master batch 1 prepared in advance and 5 parts by mass of polymer particles (P1) were added to the vessel and stirred at 60° C. Accordingly, resin composition 3 was obtained.

When the viscosity of resin composition 3 was measured, the viscosity at 30° C. was 1.4×10$^3$ Pa·s, and the minimum viscosity was 2.9×10$^0$ Pa·s at 85° C.

Using resin composition 3 and carbon fiber bundle 1, a prepreg was prepared the same as in Example 1. When the basis weight of the prepreg was measured, the fiber content was 261 g/m$^2$ and the resin content was 28.9%.

The amount of resin flow (flow rate (%)) from the prepreg during the compression-molding process was measured. The appearance of the compression-molded article was excellent (evaluated as "A"). The results are shown in Table 3.

Examples 5, 6

Resin compositions 5 and 6 were respectively prepared by employing the same process as in Example 1 using their respective composition ratios specified in Table 3. The viscosity at 30° C. and the minimum viscosity of each resin composition are shown in Table 3.

Using resin composition 5 and carbon fiber bundle 1, a prepreg was prepared the same as in Example 1. When the basis weight of the prepreg was measured, the fiber content was 253 g/m$^2$ and the resin content was 30.7%.

Using resin composition 6 and carbon fiber bundle 1, a prepreg was prepared the same as in Example 1. When the basis weight of the prepreg was measured, the fiber content was 252 g/m$^2$ and the resin content was 29.9%.

Example 7

Resin composition 7 was prepared by employing the same process as in Example 3 using the composition ratios specified in Table 3. The viscosity at 30° C. and the minimum viscosity of the resin composition are shown in Table 3.

Using resin composition 7 and carbon fiber bundle 1, a prepreg was prepared the same as in Example 1. When the basis weight of the prepreg was measured, the fiber content was 257 g/m$^2$ and the resin content was 29.0%.

Comparative Example 1

Resin composition 31 was prepared by employing the same process as in Example 1 except that polymer particles (P1) were not added.

When the viscosity of resin composition 31 was measured, the viscosity at 30° C. was 1.3×10$^3$ Pa·s, and the minimum viscosity was 7.4×10$^{-1}$ Pa·s at 103° C.

Using resin composition 31 and carbon fiber bundle 1, a prepreg was prepared the same as in Example 1. When the basis weight of the prepreg was measured, the fiber content was 282 g/m$^2$ and the resin content was 29.0%.

The amount of resin flow (flow rate (%)) from the prepreg during the compression-molding process was measured. Lines were observed along reinforcing fibers on the surface of the compression-molded article, and the appearance was not good (evaluated as "C"). The results are shown in Table 3.

Comparative Examples 3, 4

Using the composition ratios specified in Table 3, resin compositions were respectively prepared by employing the same process as in Example 1. Accordingly, resin composition 33 was obtained in Comparative Example 3, and resin composition 34 was obtained in Comparative Example 4. The viscosity at 30° C. and the minimum viscosity of each resin composition are shown in Table 3.

Using resin composition 33 and carbon fiber bundle 1, a prepreg was prepared the same as in Example 1 (Comparative Example 3). When the basis weight of the prepreg was measured, the fiber content was 252 g/m$^2$ and the resin content was 32.5%.

The amount of resin flow (flow rate (%)) from the prepreg during the compression-molding process was measured. Lines were observed along reinforcing fibers on the surface of the compression-molded article, and the appearance was not good (evaluated as "C"). The results are shown in Table 3.

Using resin composition 34 and carbon fiber bundle 1, an effort was made to prepare a prepreg the same as in Example 1; however, the viscosity of the resin composition was too low to form a resin film (Comparative Example 4).

TABLE 3

|  | Example 1 | Example 2 | Example 3 | Example 5 | Example 6 | Example 7 | Comp. Example 1 | Comp. Example 3 | Comp. Example 4 |
|---|---|---|---|---|---|---|---|---|---|
| jER828 | 50 | 50 | 70 | 10 | 13 | 88 | 50 | 10 | 100 |
| jER834 |  |  |  | 30 | 47 |  |  | 10 |  |
| jER1001 | 50 | 50 |  | 60 | 40 |  | 50 | 80 |  |
| jER1002 |  |  | 20 |  |  |  |  |  |  |
| jER1009 |  |  | 10 |  |  |  |  |  |  |
| jER1010 |  |  |  |  |  | 12 |  |  |  |
| 2PHZ-PW | 8.7 | 8.7 | 8.7 | 8.7 | 8.7 | 8.7 | 8.7 | 8.7 | 8.7 |
| HX3742 | 5 | 5 | 5 | 5 | 5 | 5 | 5 | 5 | 5 |
| Polymer particles (P1) | 5 | 10 | 5 | 5 | 5 | 5 | 0 | 5 | 5 |
| Content of epoxy resin with molecular weight of 100 to 480 | 50.5 | 50.5 | 61.6 | 32.7 | 40.7 | 75.7 | 50.5 | 25.7 | 85.9 |
| Content of epoxy resin with molecular weight of 2000 to 40000 | 18.6 | 18.6 | 20.7 | 24.7 | 18.6 | 11.3 | 18.6 | 30.6 | 0.0 |
| Viscosity at 30° C. (Pa · s) | $2.9 \times 10^3$ | $2.1 \times 10^3$ | $1.4 \times 10^3$ | $5.5 \times 10^4$ | $1.1 \times 10^4$ | $1.1 \times 10^2$ | $1.3 \times 10^3$ | $>1.2 \times 10^5$ | $8.6 \times 10^0$ |
| Minimum viscosity (Pa · s) | 1.8 | 2.2 | 2.9 | 2.8 | 1.9 | 1.9 | 0.7 | 6.7 | 0.4 |
| Resin flow rate (%) | 3.5 | 2.3 | 2.1 | 4.1 | 3.9 | 3.9 | 4.9 | 2.9 | — |
| Appearance of compression-molded article | A | A | A | A | A | A | C | C | — |

Examples 8~10, Comparative Example 5

Resin compositions 8~10 (respectively corresponding to Examples 8~40) and resin composition 35 (corresponding to Comparative Example 5) were prepared using the composition ratios specified in Table 4 by employing the same process as in Example 1. The viscosity at 30° C. and the minimum viscosity of each resin composition are shown in Table 4.

Using resin compositions 8~40 and 35 and carbon fiber bundle 1, prepregs were each prepared the same as in Example 1. When the basis weight of each of the prepregs was measured, the fiber content and the resin content were 252 g/m² and 29.1% (Example 8), 251 g/m² and 30.2% (Example 9), 249 g/m² and 29.4% (Example 10), and 246 g/m² and 29.8% (Comparative Example 5).

The amount of resin flow (flow rate (%)) from each prepreg during the compression-molding process was measured. The results are shown in Table 4. Lines were observed along reinforcing fibers on the surface of the compression-molded article formed using resin composition 35 of Comparative Example 5 and carbon fiber bundle 1, and the appearance was not good (evaluated as "C").

TABLE 4

|  | Example 8 | Example 9 | Example 10 | Comp. Example 5 |
|---|---|---|---|---|
| jER828 | 50 | 50 | 50 | 50 |
| jER1001 | 50 | 50 | 50 | 50 |
| 2PHZ-PW | 8.7 | 8.7 | 8.7 | 8.7 |
| HX3742 | 5 | 5 | 5 | 5 |
| Polymer particles (P1) | 2 | 20 | 30 | 35 |
| Content of epoxy resin with molecular weight of 100 to 480 | 50.5 | 50.5 | 50.5 | 50.5 |
| Content of epoxy resin with molecular weight of 2000 to 40000 | 18.6 | 18.6 | 18.6 | 18.6 |
| Viscosity at 30° C. (Pa · s) | $1.2 \times 10^3$ | $4.9 \times 10^3$ | $3.9 \times 10^3$ | $7.3 \times 10^3$ |
| Minimum viscosity (Pa · s) | 0.9 | 4.2 | 6.3 | 7.6 |
| Resin flow rate (%) | 4.6 | 2.7 | 2.0 | 1.5 |
| Appearance of compression-molded article | B | A | A | C |

Examples 11~13

Using the composition ratios specified in Table 5, resin compositions 11~13 were respectively prepared by employing the same process as in Example 1. The viscosity at 30° C. and the minimum viscosity of each resin composition are shown in Table 5.

Using resin compositions 11~13 and carbon fiber bundle 1, prepregs were each prepared the same as in Example 1. When the basis weight of the prepreg was measured, the fiber content and the resin content were 248 g/m² and 29.8% (Example 11), 243 g/m² and 29.8% (Example 12), and 241 g/m² and 30.9% (Example 13).

The amount of resin flow (flow rate (%)) from each prepreg during the compression-molding process was measured. The results are shown in Table 5.

TABLE 5

|  | Example 11 | Example 12 | Example 13 |
|---|---|---|---|
| jER828 | 50 | 50 | 50 |
| jER1001 | 50 | 50 | 50 |
| 2PHZ-PW | 8.7 | 8.7 | 8.7 |
| HX3742 | 5 | 5 | 5 |
| Polymer particles (P2) | 5 |  |  |
| Polymer particles (P3) |  | 5 |  |
| Acrylic polymer particles 1 |  |  | 5 |
| Content of epoxy resin with molecular weight of 100 to 480 | 50.5 | 50.5 | 50.5 |
| Content of epoxy resin with molecular weight of 2000 to 40000 | 18.6 | 18.6 | 18.6 |
| Viscosity at 30° C. (Pa · s) | $2.5 \times 10^3$ | $3.4 \times 10^3$ | $5.2 \times 10^3$ |
| Minimum viscosity (Pa · s) | 1.5 | 0.9 | 3.4 |
| Resin flow rate (%) | 2.6 | 2.9 | 1.7 |
| Appearance of compression-molded article | A | A | B |

Examples 14~17

Using the composition ratios specified in Table 6, resin compositions 14~17 (respectively corresponding to Examples 14~17) were prepared by employing the same process as in Example 1. The viscosity at 30° C. and the minimum viscosity of each resin composition are shown in Table 6.

Using resin composition 14 and carbon fiber bundle 1, a prepreg was prepared the same as in Example 1 (Example 14). When the basis weight of the prepreg was measured, the fiber content was 247 g/m² and the resin content was 30.4%.

Using resin composition 15 and carbon fiber bundle 2, a prepreg was prepared the same as in Example 1 (Example 15). When the basis weight of the prepreg was measured, the fiber content was 265 g/m² and the resin content was 30.0%.

Using resin compositions 16 and 17 and carbon fiber bundle 1, prepregs were each prepared the same as in Example 1 (Examples 16, 17). When the basis weight of the prepregs was measured, fiber amounts were 263 g/m² and 269 g/m² and the fiber contents were 28.6% and 29.7%, respectively.

The amount of resin flow (flow rate (%)) from each prepreg during the compression-molding process was measured. The results are shown in Table 6.

Example 18

Resin composition 18 was prepared by employing the same process as in Example 1 except that the composition ratio was changed as shown in Table 6 and curing-agent master batch 2 was used. The viscosity at 30° C. and the minimum viscosity of the resin composition are shown in Table 6.

Using resin composition 18 and carbon fiber bundle 1, a prepreg was prepared the same as in Example 1. When the basis weight of the prepreg was measured, the fiber content was 249 g/m² and the resin content was 30.9%.

Then, the amount of resin flow (flow rate (%)) from the prepreg during the compression-molding process was measured. The result is shown in Table 6.

Example 19

Resin composition 19 was prepared by employing the same process as in Example 1 except that the composition ratio was changed as shown in Table 6 and DY9577 was used as the curing agent. The viscosity at 30° C. and the minimum viscosity of each resin composition are shown in Table 6.

Using resin composition 19 and carbon fiber bundle 1, a prepreg was prepared the same as in Example 1. When the basis weight of the prepreg was measured, the fiber content was 248 g/m² and the resin content was 31.1%.

Then, the amount of resin flow (flow rate (%)) from the prepreg during the compression-molding process was measured. The results are shown in Table 6.

TABLE 6

|  | Example 14 | Example 15 | Example 16 | Example 17 | Example 18 | Example 19 |
|---|---|---|---|---|---|---|
| Modified epoxy resin | 86.9 | | | | | |
| jER828 | 13.1 | 50 | 50 | 50 | 50 | 50 |
| jER1001 | | 50 | 50 | 50 | 50 | 50 |
| PESE2020P | | | 5 | | | |
| C-301 | | | | 15 | | |
| 2PHZ-PW | 8.7 | 8.7 | 8.7 | 8.7 | | |
| HX3742 | 5 | 5 | 5 | 5 | | |
| Dicy15 | | | | | 7 | |
| Omicure 24 | | | | | 4 | |
| DY9577 | | | | | | 5 |
| Polymer particles (P1) | 5 | 5 | 5 | 5 | 5 | 5 |
| Content of epoxy resin with molecular weight of 100 to 480 | 48.17 | 50.50 | 50.50 | 50.50 | 50.50 | 50.50 |
| Content of epoxy resin with molecular weight of 2000 to 40000 | 23.09 | 18.61 | 18.61 | 18.61 | 18.61 | 18.61 |
| Viscosity at 30° C. (Pa · s) | $4.6 \times 10^4$ | $2.9 \times 10^3$ | $4.6 \times 10^3$ | $1.6 \times 10^3$ | $4.5 \times 10^3$ | $1.3 \times 10^3$ |
| Minimum viscosity (Pa · s) | 3.8 | 1.8 | 1.8 | 2.5 | 1.7 | 1.1 |
| Resin flow rate (%) | 3.5 | 4.0 | 2.3 | 3.0 | 2.5 | 2.3 |
| Appearance of compression-molded article | A | A | A | A | A | A |

Example 4

Resin film 1 with a basis weight of 165 g/m² was prepared by coating resin composition 1 on a release paper at 60° C. using a multi-coater M-500, made by Hirano Tecseed. Resin film 1 was impregnated into a non-woven glass fiber fabric (10 g/m, made by H&V Company). Accordingly, glass fiber-containing resin film 1 was obtained.

On the surface of PYROFIL prepreg TR 366E 250S (made by Mitsubishi Rayon) prepared by unidirectionally laminating five plies, the glass fiber-containing resin film 1 was arranged to form laminate 1. Laminate 1 was compression-molded under conditions of surface pressure at 8 MPa, die temperature at 140° C., and molding time of 5 minutes.

The appearance of the compression-molded article was excellent (evaluated as "A"). The results are shown in Table 7.

Example 20

Using the resin film 1 obtained in Example 4, laminate 3 was prepared by employing the same process as in Example 4 except that resin film 1 was used as is, without being impregnated into a non-woven glass fiber fabric. Laminate 3 was compression-molded the same as in Example 4.

The appearance of the compression-molded article was excellent (evaluated as "A"). The results are shown in Table 7.

Comparative Example 2

Resin film 2 with a basis weight of 173 g/m² and glass fiber-containing resin film 2 were prepared by employing the same process as in Example 4 except that resin composition 31 was used.

Laminate 2 was prepared the same as in Example 4 except that glass fiber-containing resin film 2 was used, and laminate 2 was compression-molded under the same conditions as in Example 4.

Lines were observed along reinforcing fibers on the surface of the compression-molded article, and the appearance was not good (evaluated as "C"). The result are shown in Table 7.

TABLE 7

|  | Example 4 | Example 20 | Comp. Example 2 |
|---|---|---|---|
| jER828 | 50 | 50 | 50 |
| jER1001 | 50 | 50 | 50 |
| 2PHZ-PW | 8.7 | 8.7 | 8.7 |
| HX3742 | 5 | 5 | 5 |
| Polymer particles (P1) | 5 | 5 | 0 |
| Content of epoxy resin with molecular weight of 100 to 480 | 50.5 | 50.5 | 50.5 |
| Contnet of epoxy resin with molecular weight of 2000 to 40000 | 18.6 | 18.6 | 18.6 |
| Glass non-woven fabric | contained | none | contained |
| Appearance of compression-molded article | A | A | C |

INDUSTRIAL APPLICABILITY

According to the present invention, a prepreg is obtained to show an appropriate amount of resin flow (flow rate (%)) during a molding process and to have excellent drapability, and a compression-molded article is formed accordingly using the prepreg. Also, a resin composition for forming the prepreg is obtained to exhibit excellent results of impregnation into a reinforcing fiber material.

What is claimed is:

1. A resin composition, comprising:
(A) an epoxy resin comprising an epoxy resin (a1) with a molecular weight of 100 to 480 and an epoxy resin (a2) with a molecular weight of 2000 to 40000;
(B) a curing agent; and
(C) vinyl polymer particles, which are observed as particles in the resin composition at a temperature of 10 to 30° C. and are dissolved in or swollen by the resin composition at a temperature above 30° C.,
wherein:
a content of the epoxy resin (a1) is 30 to 90 parts by mass based on 100 parts by mass of the epoxy resin (A);
a content of the epoxy resin (a2) is 10 to 70 parts by mass based on 100 parts by mass of the epoxy resin (A);
a content of the vinyl polymer particles (C) is 2 to 30 parts by mass based on 100 parts by mass of the epoxy resin (A); and
a maximum value of instantaneous increase in viscosity of the vinyl polymer particles (C) is 0.3 to 5.0 Pa·s/° C.

2. The resin composition according to claim 1, wherein:
the resin composition has a viscosity at 30° C. of $1.0 \times 10^2$ to $1.0 \times 10^5$ Pa·s; and
the resin composition has a minimum viscosity measured at a rate of temperature rise of 2° C./min. of 0.8 to 10 Pa·s.

3. The resin composition according to claim 1, wherein the vinyl polymer particles (C) are core-shell particles having a core layer and shell layer both made of acrylic resin.

4. The resin composition according to claim 3, wherein a glass transition temperature of the shell layer of the core-shell particles is 85 to 115° C., a value of solubility parameter is 20.20 to 20.50 $[(J/cm^3)^{1/2}]$, and a mass ratio of the core layer and shell layer is 90:10 to 50:50.

5. The resin composition according to claim 1, wherein the vinyl polymer particles (C) are obtained by conducting two or more stages of emulsion polymerization on vinyl monomer mixtures hating different compositions, and by spray-drying the emulsion of the vinyl polymer.

6. The resin composition according to claim 5, wherein the vinyl monomer mixtures have monomers selected from the group consisting of (i) (meth)acrylates that may have a functional group and (ii) (meth)acrylic acids.

7. The resin composition according to claim 5, wherein a glass transition temperature of the outermost emulsion-polymerized layer (i) of the vinyl polymer particles (C) is 85 to 115° C., a value of solubility parameter is 20.20 to 20.50 $[(J/cm^3)^{1/2}]$, and a mass ratio of the outermost emulsion-polymerized layer (i) and the other emulsion-polymerized layer (ii) is 10:90 to 50:50.

8. The resin composition according to claim 1, wherein an average particle diameter of the vinyl polymer particles (C) is 0.5 to 1.0 μM.

9. The resin composition according to claim 1, wherein the curing agent (B) comprises at least one selected from the group consisting of an imidazole compound, dicyandiamide and a boron trichloride amine complex.

10. The resin composition according to claim 1, wherein a thickening starting temperature of the vinyl polymer particles (C) is 70 to 90° C.

11. A prepreg, comprising:
the resin composition according to claim 1; and
a reinforcing fiber material.

12. A prepreg laminate, comprising the prepreg according to claim 11.

13. A molded article formed by compression molding the prepreg according to claim 11.

14. A prepreg laminate, comprising a plurality of prepreg sheets, wherein:
a layer comprises the resin composition according to claim 1, and
the layer is further laminated on at least either outermost layer.

15. A molded article formed by compression molding the prepreg laminate according to claim 14.

16. A prepreg laminate, comprising a plurality of prepreg sheets, wherein a prepreg layer of fiber-reinforced non-woven fabric, made by impregnating the resin composition according to claim 1 into a fiber-reinforced non-woven fabric with a fiber basis weight of 5 to 50 g/m², is further laminated on at least either outermost layer.

17. A resin composition, comprising:
(A) an epoxy resin comprising an epoxy resin (a1) with a molecular weight of 100 to 480;
(B) a curing agent; and
(C) vinyl polymer particles, which are observed as particles in the resin composition at a temperature of 10 to 30° C. and are dissolved in or swollen by the resin composition at a temperature above 30° C.,
wherein:
a content of the epoxy resin (a1) is 30 to 80 parts by mass based on 100 parts by mass of the epoxy resin (A);
the resin composition has a viscosity at 30° C. of $1.0 \times 10^2$ to $1.0 \times 10^5$ Pa·s;
the resin composition has a minimum viscosity measured at a rate of temperature rise of 2° C./min. of 0.8 to 10 Pa·s;
a content of the vinyl polymer particles (C) is 2 to 30 parts by mass based on 100 parts by mass of the epoxy resin (A); and a maximum value of instantaneous increase in viscosity of the vinyl polymer particles (C) is 0.3 to 5.0 Pa·s/° C.

* * * * *